(12) United States Patent
Karichev et al.

(10) Patent No.: US 7,452,626 B2
(45) Date of Patent: Nov. 18, 2008

(54) FUEL CELL FOR PORTABLE RADIO-ELECTRONIC EQUIPMENT

(75) Inventors: Ziya Ramizovich Karichev, Moscow (RU); Mikhail Romanovich Tarasevich, Moscow (RU); Vera Alexandrovna Bogdanovskaya, Moscow (RU)

(73) Assignee: Zakrytoe aksionernoe Obschestvo "Independent Power Technologies", St. Petersburg (RU)

( * ) Notice: Subject to any disclaimer, the term of this patent is extended or adjusted under 35 U.S.C. 154(b) by 377 days.

(21) Appl. No.: 10/546,932

(22) PCT Filed: Feb. 26, 2004

(86) PCT No.: PCT/RU2004/000068

§ 371 (c)(1),
(2), (4) Date: Dec. 1, 2005

(87) PCT Pub. No.: WO2004/077596

PCT Pub. Date: Sep. 10, 2004

(65) Prior Publication Data

US 2006/0099484 A1    May 11, 2006

(30) Foreign Application Priority Data

Feb. 27, 2003   (RU) ............................... 2003105522

(51) Int. Cl.
*H01M 4/90*   (2006.01)
*H01M 8/10*   (2006.01)

(52) U.S. Cl. .............................. 429/41; 429/30; 429/42; 429/44

(58) Field of Classification Search .................. 429/30, 429/33, 41, 42, 44
See application file for complete search history.

(56) References Cited

U.S. PATENT DOCUMENTS 3,819,416 A * 6/1974 Grubb et al. .............. 429/42 X (Continued)

FOREIGN PATENT DOCUMENTS

DE         10136753 A1    2/2003

(Continued)

*Primary Examiner*—Stephen J. Kalafut
(74) *Attorney, Agent, or Firm*—Woodcock Washburn, LLP

(57) ABSTRACT

The invention relates to the field of alcohol-air fuel cells (FC) designed for use in portable radio-electronic equipment, such as cellular phones, notebooks, etc. In accordance with the invention a fuel cell FC comprises a housing with arranged therein a liquid catalytically active anode, an air catalytically active hydrophobic gas-diffusion cathode, a liquid alcohol-alkaline mixture filling the interior cavity of the housing and separating the anode and cathode, wherein the hydrophobic surface of the cathode faces air. The surface of the cathode facing the alcohol-alkaline mixture is coated with a layer of a polymer, for example polybenzimidazole, having conduction in respect to OH— ions. A non-platinum catalyst on the base of metals Fe, Ni, Co, Ru, that is tolerant in respect to alcohol, is used as the cathode catalyst. A 4M KOH+4M alcohol mixture is used as the alcohol-alkaline mixture, and methanol, ethanol, propanol, butanol, ethylene glycol or glycerine is used as the alcohol in the alcohol-alkaline mixture. An Ni/Ru catalyst on a high surface area carbon carrier may be used as the anode catalyst, wherein Ni/Ru is present in the anode catalyst in the form of nanoparticles. An Ni/Ru catalyst obtained by the method of thermochemical synthesis on carbon black, electrodeposition, a chemical method, mechanical mixing may be used as the anode catalyst. Silver or pyropolymers of N4-complexes on a carbon carrier may be used as the cathode catalyst. The cathode catalyst may be mixed with polybenzimidazole.

11 Claims, 1 Drawing Sheet

U.S. PATENT DOCUMENTS

| | | | | |
|---|---|---|---|---|
| 4,615,954 A * | 10/1986 | Solomon et al. | ............ | 429/44 X |
| 6,420,059 B1 | 7/2002 | Surampudi et al. | ............. | 429/13 |
| 6,485,851 B1 * | 11/2002 | Narayanan et al. | ......... | 429/42 X |
| 6,869,712 B2 * | 3/2005 | Mittelstadt et al. | ............. | 429/30 |
| 7,056,610 B2 * | 6/2006 | Divisek | ..................... | 429/33 X |
| 2002/0106542 A1 | 8/2002 | Matejcek et al. | ............... | 429/22 |

FOREIGN PATENT DOCUMENTS

| | | |
|---|---|---|
| JP | 43-20727 | 9/1968 |
| RU | 2044371 C1 | 9/1995 |
| WO | WO 01/39307 A2 | 5/2001 |
| WO | WO 2004/077596 A1 | 9/2004 |

* cited by examiner

FUEL CELL FOR PORTABLE RADIO-ELECTRONIC EQUIPMENT

FIELD OF THE INVENTION

The invention relates to the field of alcohol-air fuel cells (FC) designed for use in portable radio-electronic equipment, such as cellular phones, notebooks, etc.

BACKGROUND OF THE INVENTION

An FC is known that comprises a housing with a fuel electrode, an air carbon platinized electrode, a fuel-electrolyte mixture consisting of a 6N solution of sulfuric acid and methanol, arranged therein (Japanese application No. 43-20727, class 57 AO, 1968).

A drawback of this FC is the presence of a corrosion-active acid electrolyte, which makes the construction of the FC more expensive because of the limited choice of structural materials and the use of noble metal catalysts.

Among the known FCs, the one most similar in respect to the combination of essential features and achieved technical result is the FC comprising a housing with a liquid catalytically active anode, an air catalytically active hydrophobic gas-diffusion cathode, a liquid alcohol-alkaline mixture filling the interior cavity of the housing and separating the anode and cathode, wherein a hydrophobic surface of the cathode faces air (RU patent No. 2044371C1, class H 01 M 8/08, 1995).

Drawbacks of this known FC are the instability of the electrical characteristics because of the direct contact between the cathode and the fuel and products of the reaction, which may cause poisoning of the cathode catalyst, and the use of an expensive catalyst of noble metals on the anode.

SUMMARY OF THE INVENTION

The object of the invention is to create an FC that has high, stable characteristics and is inexpensive, for use in portable radio-electronic equipment.

Said technical result is achieved in that in an FC comprising a housing with arranged therein a liquid catalytically active anode, air catalytically active hydrophobic gas-diffusion cathode, a liquid alcohol-alkaline mixture filling the interior cavity of the housing and separating the anode and cathode, wherein a hydrophobic surface of the cathode faces air, in accordance with the invention a surface of the cathode facing the alcohol-alkaline mixture is coated with a layer of a polymer having conductance in respect to $OH^-$ ions, and a non-platinum catalyst that is tolerant in respect to alcohol is used as a cathode catalyst.

The presence of a layer of a polymer with conductance in respect to $OH^-$ ions on the cathode prevents the migration of fuel to the cathode and the possibility of its being contaminated. The use of a non-platinum catalyst, tolerant to alcohol, stabilizes the electrical characteristics and reduces the cost of the FC.

It is advisable that a 4M KOH+4M alcohol mixture be used as the alcohol-alkaline mixture in the FC. When this mixture is used, maximum electrical characteristics are achieved.

It is advisable that methanol, ethanol, propanol, butanol, ethylene glycol or glycerine be used as the alcohol in the alcohol-alkaline mixture. These alcohols, during oxidation in the FC, ensure high electrical characteristics.

It is advisable that polybenzimidazole doped with $OH^-$ ions be used as the polymer coating the surface of the cathode that faces the alcohol-alkaline mixture. This polymer has the required conductance values and diffusion resistance in respect to transfer of the alcohol.

It is advisable that a non-platinum catalyst on the base of Fe, Ni, Co, Ru metals be used as the anode catalyst. These catalysts are distinguished by higher selectivity and are not poisoned by CO and other intermediate products of the oxidation of alcohols.

It is advisable that an Ni/Ru catalyst on a high surface area carbon carrier be used as the anode catalyst, that Ni/Ru be present in the anode catalyst in the form of nanoparticles. This catalyst has maximum electrocatalytic activity.

It is advisable that an Ni/Ru catalyst prepared by thermochemical synthesis on carbon black, an electrodeposition method, a chemical method or mechanical mixing, be used as the anode catalyst. These catalysts have sufficient electrocatalytic activity in an alcohol oxidation reaction.

It is advisable that silver on a carbon carrier or pyropolymers of $N_4$-complexes on a carbon carrier be used as the cathode catalyst, wherein the catalyst may be mixed with polybenzimidazole. These catalysts are tolerant in respect to alcohol and have sufficient activity in respect to an oxygen reduction reaction.

The essence of the invention is explained by the drawing and by the example of practical realization of the FC.

Figure 1:
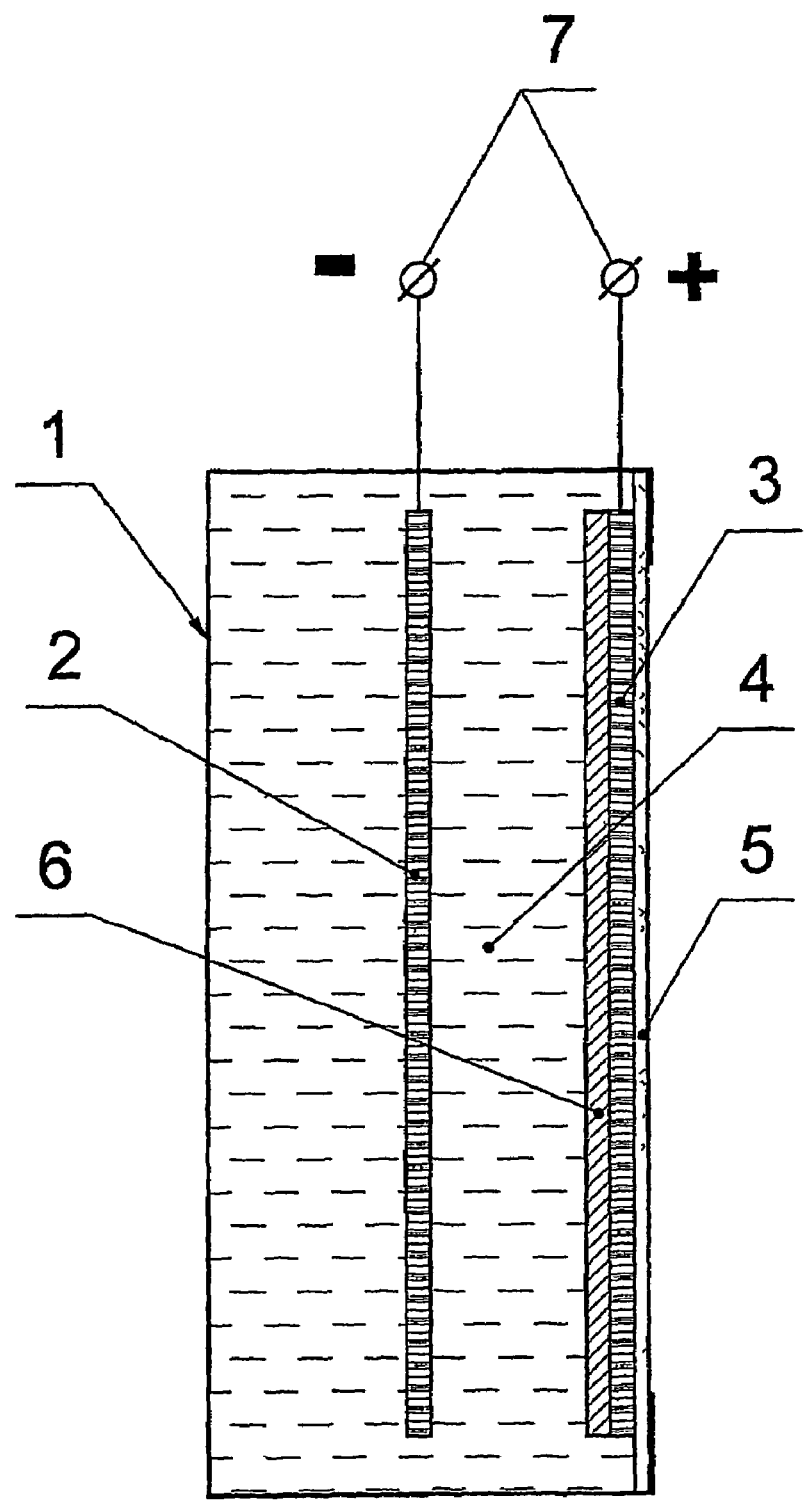
FIG. 1 shows an FC in section.

The claimed FC comprises an anode chamber 1 with a liquid anode 2, an air cathode 3 with a hydrophobic layer 5 and a polymer layer 6, a fuel-alkaline mixture 4 and current terminals 7.

The claimed FC operates in the following manner. The functioning technology of the FC is provided for the variant in which a methanol-alkaline mixture is used as the fuel. A methanol-alkaline mixture 4 is poured into the FC and fills the anode chamber 1 and the gap between the liquid anode 2 and the air cathode 3. The hydrophobic surface 5 of the air cathode 3 is open for the access of air from the surroundings. When an external load is connected to the current terminals 7, a methanol oxidation reaction will take place on the anode 2 with the generation of free electrons which will go to the external load and with the formation of water and carbon dioxide, an air oxygen reduction reaction will take place on the cathode with the formation of $OH^-$ ions which will diffuse through the alkaline electrolyte to the anode and participate in the water formation reaction on the anode. Overall equation of the current generation reaction is: $CH_3OH+3/2O_2=CO_2+2H_2O$. The water formed as a result of passing the current generation reaction enters the methanol-alkaline mixture, causing its dilution, and the carbon dioxide is absorbed by the alkaline with the formation of carbonates. In order to ensure long-time working capacity of the FC, the concentration of methanol, alkaline and carbonates should be maintained in the fuel mixture within predetermined ranges. Depending on the purpose of the FC, the maintenance of the predetermined concentrations is ensured either by discharging and replacing the fuel mixture or by adding fuel to the mixture, removing water and carbonates from the mixture, which is done by the use of special functional systems.

EXAMPLE OF REALIZATION

In accordance with the invention a prototype of an FC was produced using on the anode an Ni/Ru catalyst, synthesized thermochemically on carbon black with a specific surface of 60 $m^2/g$, with the Ru content of 75% in the catalyst. Carbon black AD 100, promoted by 15 wt. % of silver, was used as a catalyst on the cathode. A layer of polymer from polybenzimidazole with a thickness of 60 μm, doped in 6 M KOH was applied to the cathode from the side of the electrolyte by the evaporation method. When a mixture of 4 M KOH+4 M alcohol is used as the fuel and a working temperature is 60° C., the FC with said anode and cathode develops a current density of 80 mA/cm$^2$ at a voltage of 0.5 V. In view of the foregoing, the conclusion may be made that the claimed FC may be realized in practice with achievement of the claimed technical result.

The invention claimed is:

1. A fuel cell comprising a housing containing an anode comprising Nickel/Ruthenium on a refined carbon carrier, and a catalytically active, hydrophobic, gas-diffusive cathode, the anode and cathode being separated by an alkaline liquid alcohol mixture filling an interior cavity of the housing; wherein a hydrophobic surface of the cathode is in contact with air, a further surface of the cathode, in contact with the alkaline alcohol mixture, being covered with a layer of polybenzimidazole doped with hydroxyl ions.

2. The fuel cell according to claim 1, characterized in that a 4M KOH+4M alcohol mixture is used as the alcohol-alkaline mixture.

3. The fuel cell according to claim 1, characterized in that methanol, ethanol, propanol, butanol, ethylene glycol or glycerine is used as the alcohol in the alcohol-alkaline mixture.

4. The fuel cell according to claim 1, characterized in that that Ni/Ru is present in the anode catalyst in the form of nanoparticles.

5. The fuel cell according to claim 1, characterized in that an Ni/Ru catalyst, thermochemically synthesized on carbon black, is used as the anode catalyst.

6. The fuel cell according to claim 1, characterized in that an Ni/Ru catalyst, obtained by an electrodeposition method, is used as the anode catalyst.

7. The fuel cell according to claim 1, characterized in that an Ni/Ru catalyst, obtained by a chemical method, is used as the anode catalyst.

8. The fuel cell according to claim 1, characterized in that an Ni/Ru catalyst, obtained by mechanical mixing, is used as the anode catalyst.

9. The fuel cell according to claim 1, characterized in that the cathode catalyst is mixed with polybenzimidazole.

10. The fuel cell according to claim 1 or claim 9, characterized in that silver on a carbon carrier is used as the cathode catalyst.

11. The fuel cell according to claim 1 or claim 9, characterized in that pyropolymers of N.sub.4-complexes on a carbon carrier are used as the cathode catalyst.

* * * * *